US009123108B2

(12) United States Patent
Tajima

(10) Patent No.: US 9,123,108 B2
(45) Date of Patent: Sep. 1, 2015

(54) IMAGE PROCESSING DEVICE, RADIOGRAPHIC IMAGE CAPTURE SYSTEM, IMAGE PROCESSING METHOD, AND IMAGE PROCESSING STORAGE MEDIUM

(75) Inventor: Takashi Tajima, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 467 days.

(21) Appl. No.: 13/470,382

(22) Filed: May 14, 2012

(65) Prior Publication Data
US 2012/0300899 A1 Nov. 29, 2012

(30) Foreign Application Priority Data
May 25, 2011 (JP) ................... 2011-117178

(51) Int. Cl.
G06T 7/00 (2006.01)
(52) U.S. Cl.
CPC ....... *G06T 7/003* (2013.01); *G06T 2207/10081* (2013.01); *G06T 2207/10124* (2013.01); *G06T 2207/30068* (2013.01)
(58) Field of Classification Search
CPC ............... G06T 2207/30068; G06T 7/003; G06T 2207/10081
USPC ................. 378/19, 21–27; 382/131
See application file for complete search history.

(56) References Cited

U.S. PATENT DOCUMENTS 5,627,907 A * 5/1997 Gur et al. ............... 382/132
5,872,828 A * 2/1999 Niklason et al. ............ 378/23

(Continued)

FOREIGN PATENT DOCUMENTS

| CN | 1953708 A | 4/2007 |
|---|---|---|
| JP | 2000-514223 | 10/2000 |
| JP | 2002-170122 A | 6/2002 |
| JP | 2007-033157 A | 2/2007 |
| JP | 2007-536968 | 12/2007 |
| JP | 2008-110098 | 5/2008 |
| JP | 2010-131170 A | 6/2010 |
| JP | 2010-162154 A | 7/2010 |

OTHER PUBLICATIONS

Partial English language translation of the following: Office action dated Apr. 23, 2013 from the Japanese Patent Office in a Japanese patent application corresponding to the instant patent application. This office action translation is submitted now in order to supplement the understanding of patent document JP2007-536968, JP2000-514223 and JP2008-110098 which are cited in the office action and are being disclosed in the instant information Dislcosure Statement.

(Continued)

Primary Examiner — David J Makiya
Assistant Examiner — John Corbett
(74) Attorney, Agent, or Firm — SOLARIS Intellectual Property Group, PLLC

(57) ABSTRACT

An image processing device includes a tomographic image generating section that acquires generates tomographic images, a display processing section that displays a second radiographic image, and detection section. If a region of interest is specified on the second radiographic image, the detection section performs image analysis by comparing the region of interest with corresponding regions that are regions in the tomographic images corresponding to the region of interest, and detects a tomographic image including a corresponding region that is similar to the region of interest. If a position of interest is specified on the second radiographic image, the detection section performs image analysis by comparing the position of interest with corresponding positions that are positions in the tomographic images corresponding to the position of interest, and detects a tomographic image including a corresponding position that is similar to the position of interest.

18 Claims, 11 Drawing Sheets

(56) References Cited

U.S. PATENT DOCUMENTS

| | | | |
|---|---|---|---|
| 6,611,575 B1 * | 8/2003 | Alyassin et al. | 378/37 |
| 6,674,880 B1 * | 1/2004 | Stork et al. | 382/128 |
| 6,801,645 B1 * | 10/2004 | Collins et al. | 382/130 |
| 7,035,450 B1 | 4/2006 | Muller et al. | |
| 2005/0220328 A1 * | 10/2005 | Itoh et al. | 382/124 |
| 2005/0245807 A1 | 11/2005 | Boese et al. | |
| 2006/0033728 A1 * | 2/2006 | Sako | 345/204 |
| 2007/0225600 A1 * | 9/2007 | Weibrecht et al. | 600/429 |
| 2008/0101536 A1 | 5/2008 | Sendai | |
| 2009/0080752 A1 * | 3/2009 | Ruth et al. | 382/132 |
| 2011/0157154 A1 * | 6/2011 | Bernard et al. | 345/419 |

OTHER PUBLICATIONS

Ataer-Cansizoglu E et al: "Towards respiration management in radiation treatment of lung tumors: Transferring regions of interest from planning CT to kilovoltage X-ray images", 2010 Annual International Conference of the IEEE Engineering in Medicine and Biology Society: (EMBC2010); Buenos Aires, Argentina, Aug. 31-Sep. 4, 2010, IEEE, Piscataway, NJ, USA, Aug. 31, 2010, pp. 3101-3104, XP032108157, DOI: 10.1109/IEMBS2010.5626126, ISBN: 978-1-4244-4123-5.

Extended European Search Report dated Nov. 16, 2012 from the EPO in an European patent application corresponding to the instant patent application.

English language translation of the following: Office action dated Jan. 14, 2015 from the SIPO in a Chinese patent application corresponding to the instant patent application. This office action translation is submitted now in order to supplement the understanding of patent document CN 1953708 which is cited in the office action and is being disclosed in the instant Information Disclosure Statement.

English language translation of the following: Office action dated May 14, 2015 from the SIPO in a Chinese patent application corresponding to the instant patent application.

\* cited by examiner

TWO-DIMENSIONAL IMAGE

TOMOGRAPHIC IMAGE

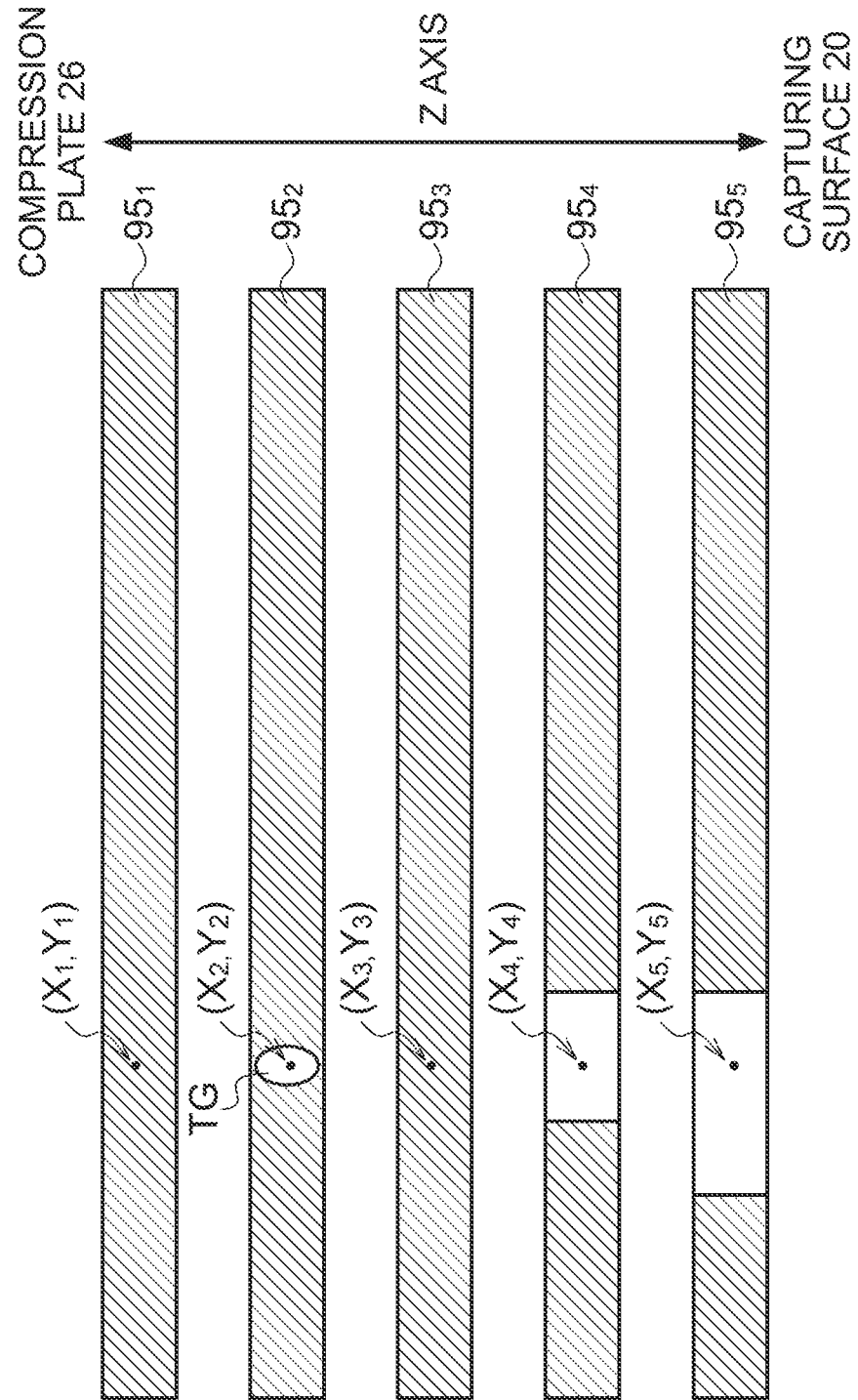

TWO-DIMENSIONAL IMAGE

TOMOGRAPHIC IMAGE

IMAGE PROCESSING DEVICE, RADIOGRAPHIC IMAGE CAPTURE SYSTEM, IMAGE PROCESSING METHOD, AND IMAGE PROCESSING STORAGE MEDIUM

CROSS-REFERENCE TO RELATED APPLICATION

This application claims priority under 35 USC 119 from Japanese Patent Application No. 2011-117178 filed on May 25, 2011, the disclosure of which is incorporated by reference herein.

BACKGROUND OF THE INVENTION

1. Field of the Invention

The present invention relates to an image processing device, a radiographic image capture system, an image processing method, and an image processing program storage medium, and in particular, to an image processing device, a radiographic image capture system, an image processing method, and an image processing program storage medium that generates section (tomographic) images from radiographic images captured by irradiating a subject with radiation from different angles.

2. Description of the Related Art

Radiographic image capture devices that perform radiographic imaging for the purpose of medical diagnosis are conventionally known. A mammography machine has been known as one of such radiographic image capture devices, which images a breast of a subject for the purpose of medical examination including detection and observation of a lesion (such as a tumor or a calcification). In mammography, a technique has been known in which plural radiographic images are obtained by tomosynthesis imaging that captures a breast of a subject from plural different angles, and tomographic images of the breast are obtained by reconstructing the captured plural radiographic images.

As plural tomographic images are obtained in tomosynthesis imaging, there are both a tomographic image in which an object of interest such as a lesion is imaged, and a tomographic image in which the object of interest is not imaged. Therefore, a user such as a doctor who performs detection or observation of a lesion with respect to a subject needs to interpret or read the plural tomographic images by switching them one by one, which requires cumbersome operations compared with a case of reading a two-dimensional image and may take a long time for the interpretation.

In this regard, techniques for obtaining tomographic images or radiographic images in which an object of interest is imaged have been proposed. For example, Japanese Patent Application Laid-Open (JP-A) No. 2010-131170 discloses a technique of generating and displaying tomographic images including a site of interest based on position information of the site of interest acquired from stereo images or ultrasonic images. JP-A No. 2010-162154 discloses a technique of identifying an image of a region corresponding to a region of interest from plural radiographic images, based on three-dimensional (3D) coordinates of the region of interest in a radiographic image, which has been input by a user.

Generally, medical examination using tomographic images obtained by tomosynthesis imaging is performed by interpreting a single two-dimensional image and the tomographic images obtained by tomosynthesis imaging.

SUMMARY

The present invention provides an image processing device, a radiographic image capture system, an image processing method, and an image processing program storage medium that allows a user to efficiently interpret one or more tomographic images in which an object of interest is imaged.

An aspect of the present invention is an image processing device having: a tomographic image generating section that acquires plural first radiographic images from a radiographic image detector, the first radiographic images are captured by the radiographic image detector by irradiating radiation, from a radiation irradiating section that is provided so as to face the radiographic image detector, from different angles with respect to a subject that is on the radiographic image detector, and generates plural tomographic images of the subject by reconstructing the plural first radiographic images using a detection surface of the radiographic image detector as a reference; a display processing section that displays on a display section a second radiographic image that is acquired by the radiographic image detector by irradiating radiation from the radiation irradiating section from a predetermined angle with respect to the subject on the radiographic image detector; and a detection section that, (a) if a region of interest including an object of interest is specified on the displayed second radiographic image, performs image analysis by comparing the region of interest with corresponding regions that are regions in the plural tomographic images corresponding to the region of interest, and detects a tomographic image including a corresponding region that is similar to the region of interest based on a result of the image analysis, and (b) if a position of interest of the object of interest is specified on the second radiographic image, performs image analysis by comparing the position of interest with corresponding positions that are positions in the plural tomographic images corresponding to the position of interest, and detects a tomographic image including a corresponding position that is similar to the position of interest based on a result of the image analysis.

Plural first radiographic images are captured by the radiographic image detector by irradiating radiation from the radiation irradiating section, that is provided so as to face the radiographic image detector, from different angles with respect to a subject on the radiographic image detector. The tomographic image generating section generates plural tomographic images of the subject by reconstructing the plural first radiographic images using the detection surface of the radiographic image detector as a reference. The display processing section causes a second radiographic image to be displayed on the display section, which is obtained from the radiographic image detector by irradiating the subject on the radiographic image detector with radiation by the radiation irradiating section from a predetermined angle. Further, if a region of interest including an object of interest is specified on the displayed second radiographic image, the detection section performs image analysis by comparing the region of interest with corresponding regions that are regions in the plural tomographic images corresponding to the region of interest, and detects a tomographic image including a corresponding region that is similar to the region of interest based on a result of the image analysis, and if a position of interest of the object of interest is specified on the second radiographic image, the detection section performs image analysis by comparing the position of interest with corresponding positions that are positions in the plural tomographic images corresponding to the position of interest, and detects a tomographic image including a corresponding position that is similar to the position of interest based on a result of the image analysis.

In a case in which there are plural tomographic images, a user such as a doctor may need to interpret the plural tomographic images by displaying them on a display section and switching them one by one, which may require long time for the interpretation.

However, in the above aspect, if a region of interest including an object of interest has been specified on the second radiographic image that is a two dimensional image, the detection section performs image analysis by comparing the region of interest with corresponding regions that are regions in the plural tomographic images corresponding to the region of interest, and detects a tomographic image including a corresponding region that is similar to the region of interest based on a result of the image analysis. Further, if a position of interest of the object of interest has been specified, the detection section performs image analysis by comparing the position of interest with corresponding positions that are positions in the plural tomographic images corresponding to the position of interest, and detects a tomographic image including a corresponding position that is similar to the position of interest based on a result of the image analysis. Thus, a tomographic image in which the object of interest is imaged can be detected and displayed on the display section, whereby a user can efficiently interpret the tomographic image including the object of interest.

In the above aspect, a configuration may be made such that (a1) if a size of the region of interest is less than a predetermined size, the detection section determines a corresponding region, in which pixel values of respective pixels are equal to or greater than a predetermined pixel value, as being similar to the region of interest, and (b1) if the position of interest is specified, the detection section determines a corresponding position, in which pixel values of respective pixels are equal to or greater than the predetermined pixel value, as being similar to the position of interest.

In the above aspect, a configuration may be made such that the detection section excludes, from a detection result, tomographic images that are adjacent in a direction of the reconstructing using the detection surface of the radiographic image detector as the reference.

In the above aspect, a configuration may be made such that (a2) if plural tomographic images including the corresponding region that is similar to the region of interest are detected, the detection section sets a detection region that includes the region of interest and is larger than the predetermined size, and performs image analysis based on pixel values of pixels of the detection region and on pixel values of pixels of the corresponding regions, and (b2) if plural tomographic images including the corresponding position that is similar to the position of interest are detected, the detection section sets a detection region that includes the position of interest, and performs image analysis based on pixel values of pixels of the detection region and on pixel values of pixels of the corresponding positions.

In the above aspect, a configuration may be made such that if a size of the region of interest is equal to or greater than a predetermined size, the detection section performs image analysis based on pixel values of pixels of the region of interest and on pixel values of pixels of the corresponding regions.

In the above aspect, a configuration may be made such that if a result of the image analysis of the detection section indicates that there is no corresponding region or corresponding position that is similar to the region of interest or the position of interest, the tomographic image generating section reduces a slice thickness for generating tomographic images, and regenerates the tomographic images.

In the above aspect, a configuration may be made such that the display processing section displays the detected tomographic image on the display section.

In the above aspect, a configuration may be made such that if plural tomographic images are detected by the detection section, the display processing section displays the detected tomographic images in order starting from a tomographic image including a corresponding region or corresponding position that has high similarity with the region of interest or the position of interest.

In the above aspect, a configuration may be made such that the predetermined angle is an angle of a direction that intersects with the detection surface of the radiographic image detector.

A second aspect of the present invention is a radiographic image capture system including: a radiographic image capture device that captures plural radiographic images by a radiographic image detector, by irradiating radiation from a radiation irradiating section that is provided so as to face the radiographic image detector, from different angles with respect to a subject that is on the radiographic image detector; and the image processing device according to the first aspect, which generates tomographic images from the radiographic images.

A third aspect of the present invention is an image processing method including: acquiring plural first radiographic images from a radiographic image detector, which are captured by the radiographic image detector by irradiating radiation, from a radiation irradiating section, that is provided so as to face the radiographic image detector, from different angles with respect to a subject that is on the radiographic image detector; generating plural tomographic images of the subject by reconstructing the plural first radiographic images using a detection surface of the radiographic image detector as a reference; displaying on a display section a second radiographic image that is acquired by the radiographic image detector by irradiating radiation from the radiation irradiating section from a predetermined angle with respect to the subject on the radiographic image detector; if a region of interest including an object of interest is specified on the displayed second radiographic image, performing image analysis by comparing the region of interest with corresponding regions that are regions in the plural tomographic images corresponding to the region of interest, and detecting a tomographic image including a corresponding region that is similar to the region of interest based on a result of the image analysis; and if a position of interest of the object of interest is specified on the second radiographic image, performing image analysis by comparing the position of interest with corresponding positions that are positions in the plural tomographic images corresponding to the position of interest, and detecting a tomographic image including a corresponding position that is similar to the position of interest based on a result of the image analysis.

A fourth aspect of the present invention is a non-transitory computer readable storage device storing a program that causes a computer to perform image processing, the image processing including: acquiring plural first radiographic images from a radiographic image detector, which are captured by the radiographic image detector by irradiating radiation, from a radiation irradiating section, that is provided so as to face the radiographic image detector, from different angles with respect to a subject that is on the radiographic image detector; generating plural tomographic images of the subject by reconstructing the plural first radiographic images using a detection surface of the radiographic image detector as a reference; displaying on a display section a second radiographic image that is acquired by the radiographic image detector by irradiating radiation from the radiation irradiating section from a predetermined angle with respect to the subject on the radiographic image detector; if a region of interest including an object of interest is specified on the displayed second radiographic image, performing image analysis by comparing the region of interest with corresponding regions that are regions in the plural tomographic images corresponding to the region of interest, and detecting a tomographic image including a corresponding region that is similar to the region of interest based on a result of the image analysis; and if a position of interest of the object of interest is specified on the second radiographic image, performing image analysis by comparing the position of interest with corresponding positions that are positions in the plural tomographic images corresponding to the position of interest, and detecting a tomographic image including a corresponding position that is similar to the position of interest based on a result of the image analysis.

As described above, the aspects of the present invention allow a user to efficiently interpret or read one or more tomographic image in which an object of interest is imaged.

BRIEF DESCRIPTION OF THE DRAWINGS

An exemplary embodiment of the present invention will be described in detail based on the following figures, wherein:

FIG. 10 is an explanatory drawing for explaining an example of a case in which plural tomographic image are detected in the image display processing;

FIGS. 11A and 11B are explanatory drawings for explaining an example of setting of a detection region in the image display processing, wherein FIG. 11A shows a case in which a position of interest (x, y) has been specified by a user, and FIG. 11B shows a case in which a region of a predetermined size around the position of interest (x, y) is set as the detection region.

DETAILED DESCRIPTION

Figure 1:
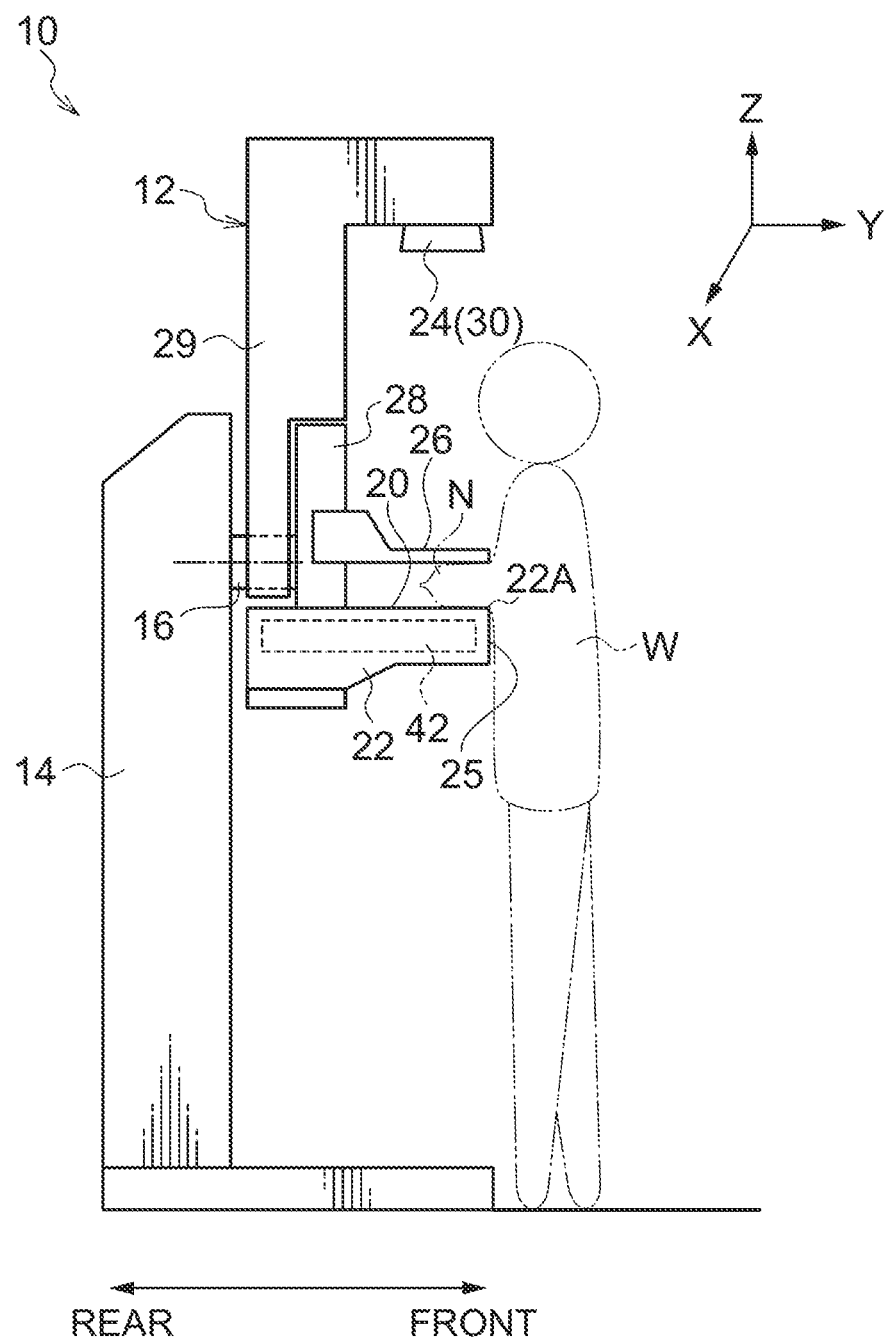
FIG. 1 is a plan view showing an example of the structure of a radiographic image capture device of the present exemplary embodiment.
Figure 2:
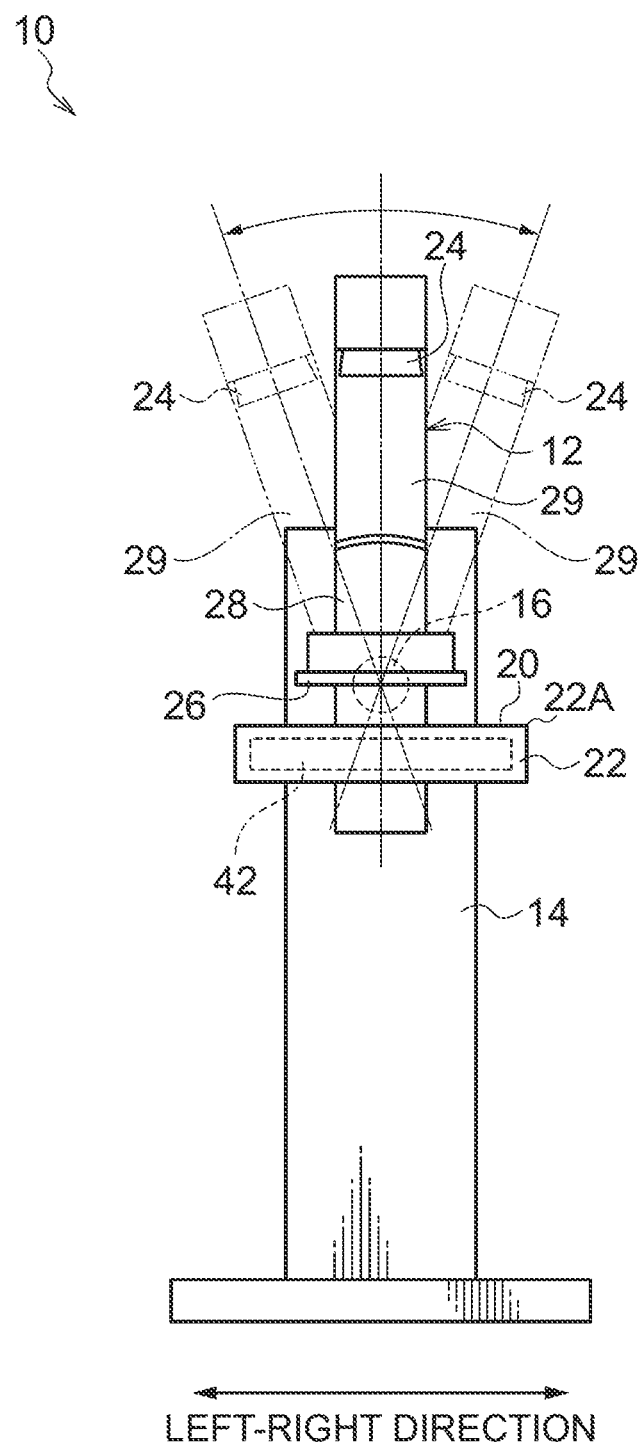
FIG. 2 is a drawing showing an example of the structure of the radiographic image capture device of the present exemplary embodiment at the time of image capturing.
Figure 3:
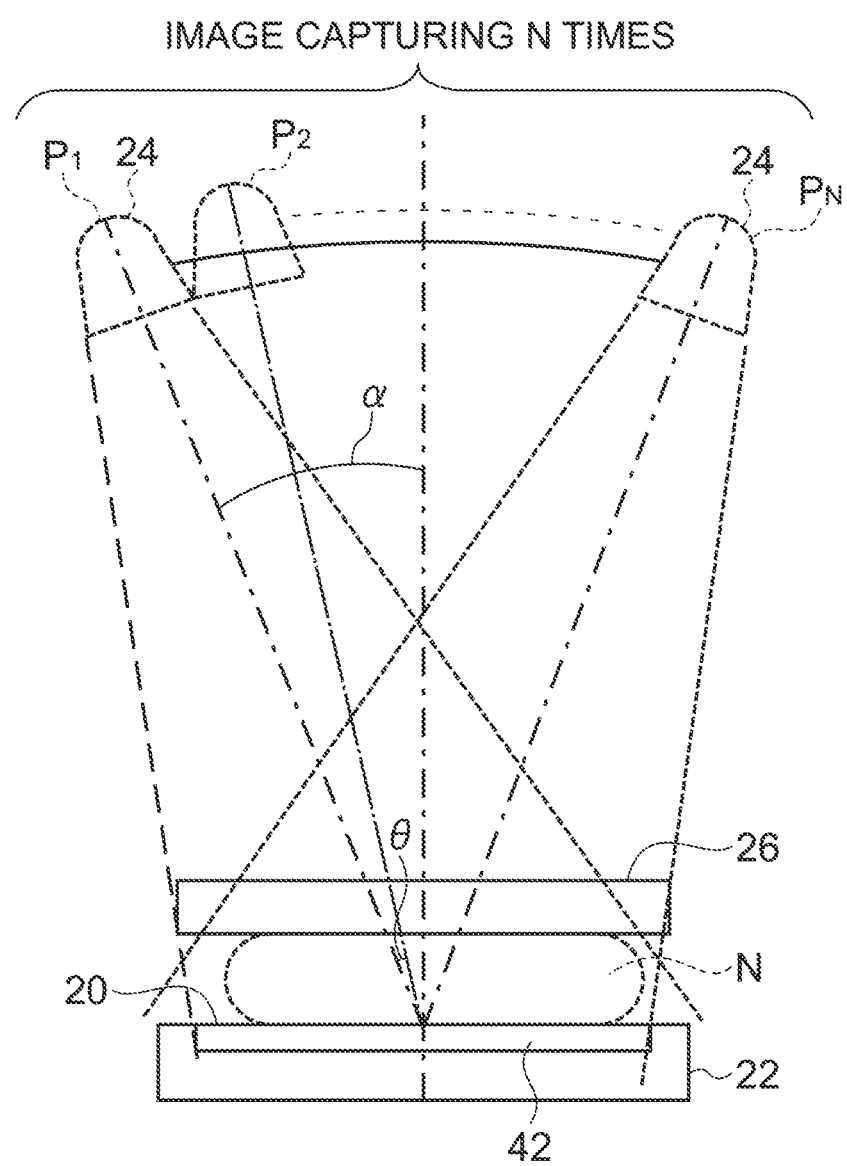
FIG. 3 is an explanatory drawing for explaining image capturing of the radiographic image capture device of the present exemplary embodiment.

As shown in FIG. 1 through FIG. 3, a radiographic image capture device 10 of the present exemplary embodiment is a device that captures an image of a breast N of a subject W by radiation (e.g., X-rays) in a state in which the subject W is standing, and is called a mammography machine for example. Note that, hereinafter, description will be given with the near side that is close to the subject W when the subject W is facing the radiographic image capture device 10 at the time of image capturing being called the device front side of the radiographic image capture device 10, the deep side that is far from the subject W when the subject W is facing the radiographic image capture device 10 being called the device rear side of the radiographic image capture device 10, and the left and right directions of the subject W when the subject W is facing the radiographic image capture device 10 being called the device left and right directions of the radiographic image capture device 10 (refer to the respective arrows in FIG. 1 through FIG. 3).

The object of imaging at the radiographic image capture device 10 is not limited to the breast N, and may be, for example, another site of a human body, or an object. Further, the radiographic image capture device 10 may be a device that captures an image of the breast N of the subject W in a seated state of the subject W being seated on a chair (including a wheelchair) or the like. It suffices for the radiographic image capture device 10 to be a device that can capture images of the left breast N and the right breast N of the subject W separately, with at least the upper half of the body of the subject W being in an erect state.

As shown in FIG. 1, the radiographic image capture device 10 has a measuring section 12 that is substantially shaped as the letter C in side view and that is provided at the device front side, and a base portion 14 that supports the measuring section 12 from the device rear side.

The measuring section 12 includes an imaging table 22 at which is formed an imaging surface 20 that is planar and that the breast N of the subject W who is in an erect state contacts, a compression plate 26 for pressing the breast N between the compression plate 26 and the imaging surface 20 of the imaging table 22, and a holding section 28 that supports the imaging table 22 and the compression plate 26. The compression plate 26 is formed of a material that transmits radiation.

The measuring section 12 has a radiation irradiating section 24 that is provided with a radiation source 30 (see FIG. 4) such as a light tube and that irradiates radiation for examination from the radiation source 30 toward the imaging surface 20, and a supporting section 29 that is separate from the holding section 28 and supports the radiation irradiating section 24.

A rotating shaft 16 that is rotatably supported at the base portion 14 is provided at the measuring section 12. The rotating shaft 16 is fixed with respect to the supporting section 29, and the rotating shaft 16 and the supporting section 29 rotate integrally.

The holding section 28 can be switched between a state in which the rotating shaft 16 is connected to the holding section 28 and rotates integrally therewith, and a state in which the rotating shaft 16 is separated from the holding section 28 and rotates idly. Specifically, gears are provided respectively at the rotating shaft 16 and the holding section 28, and the state is switched between a state in which the gears are meshed-together and a state in which the gears are not meshed-together.

Any of various mechanical elements can be used for the switching between transmission/non-transmission of the rotational force of the rotating shaft 16.

The holding section 28 supports the imaging table 22 and the radiation irradiating section 24 such that the imaging surface 20 and the radiation irradiating section 24 are separated by a predetermined interval. Further, the holding section 28 slidably holds the compression plate 26 such that the interval between the compression plate 26 and the imaging surface 20 can be varied.

From the standpoints of the radiation transmitting property and strength, the imaging surface 20 that the breast N contacts is formed of carbon for example. A radiation detector 42, on which the radiation that has passed-through the breast N and the imaging surface 20 is irradiated and that detects this radiation, is disposed at the interior of the imaging table 22. The radiation that the radiation detector 42 detects is made visible, and a radiographic image is generated.

The radiographic image capture device 10 of the present exemplary embodiment is a device that can carry out at least image capturing of the breast N that is an imaging subject from plural directions. FIG. 2 and FIG. 3 respectively show postures of the radiographic image capture device 10 at these times of image capturing, and the positions of the radiation irradiating section 24 at these times of image capturing. As shown in FIG. 2 and FIG. 3, these image capturings are performed by tilting the supporting section 29, that supports the radiation irradiating section 24 and supports the imaging table 22 via the holding section 28.

As shown in FIG. 3, in a case in which image capturing from plural directions (tomosynthesis imaging) is carried out on the breast N at the radiographic image capture device 10, the rotating shaft 16 rotates idly with respect to the holding section 28, and the imaging table 22 and the compression plate 26 do not move, and only the radiation irradiating section 24 moves in an arc shape due to the supporting section 29 rotating. In the present exemplary embodiment, as shown in FIG. 3, image capturing is carried out with the position of the radiation irradiating section 24 being at N places that are P1 through PN, by moving the image capture position by a predetermined angle θ each time from angle α.

Further, the radiographic image capture device 10 of the present exemplary embodiment is a device that can carry out both Cranio & Caudal (CC) imaging and Mediolateral-Oblique (MLO) imaging of the breast N. At the time of CC imaging, the posture of the holding section 28 is adjusted to a state in which the imaging surface 20 faces upward, and the posture of the holding section 28 is adjusted to a state in which the radiation irradiating section 24 is positioned upward of the imaging surface 20. In this way, radiation is irradiated from the radiation irradiating section 24 onto the breast N from the head side toward the leg side of the subject W who is in an erect state, and CC imaging is carried out. Further, at the time of MLO imaging, generally, the posture of the holding section 28 is adjusted to a state in which the imaging table 22 is rotated by greater than or equal to 45° and less than 90° as compared with at the time of CC imaging, and is positioned such that the armpit of the subject W abuts a side wall corner 22A at the device front side of the imaging table 22. In this way, radiation is irradiated from the radiation irradiating section 24 toward the breast N from the axially central side toward the outer side of the torso of the subject W, and MLO imaging is carried out.

A chest wall surface 25, that is made to contact with the chest portion beneath the breast N of the subject W at the time of image capturing, is formed at the device front side surface of the imaging table 22. The chest wall surface 25 is planar.

Figure 4:
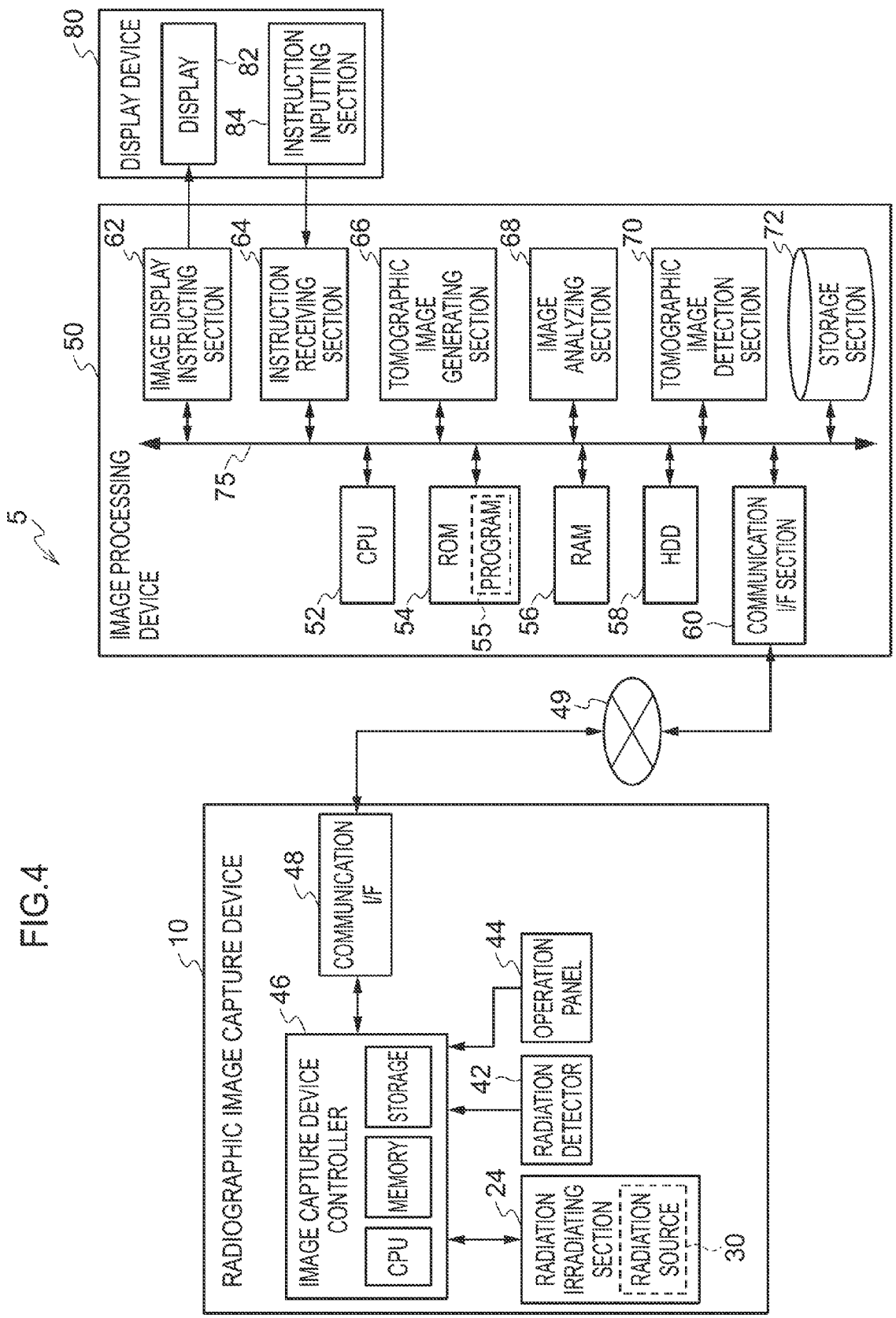
FIG. 4 is a block diagram showing an example of the structure of a radiographic image capture system of the present exemplary embodiment.

A block diagram of an example of the structure of a radiographic image capture system 5 of the present exemplary embodiment is shown in FIG. 4.

The radiographic image capture system 5 includes the radiographic image capture device 10, an image processing device 50, and a display device 80.

The radiographic image capture device 10 includes the radiation irradiating section 24, the radiation detector 42, an operation panel 44, an image capture device controller 46, and a communication I/F section 48.

The image capture device controller 46 has the function of controlling the operations of the radiographic image capture device 10 overall, and includes a Central Processing Unit (CPU), memories including a Read Only Memory (ROM) and a Random Access Memory (RAM), and a non-volatile storage formed from an Hard Disk Drive (HDD) or a flash memory or the like. Further, the image capture device controller 46 is connected to the radiation irradiating section 24, the radiation detector 42, the operation panel 44, and the communication I/F section 48.

When the image capture device controller 46 receives an irradiation instruction from an operator via the operation panel 44 (an exposure switch), the image capture device controller 46 causes radiation to be irradiated from the radiation source 30, that is provided at the radiation irradiating section 24, onto the imaging surface 20 in accordance with an image capture menu (details of which are described later) that is set on the basis of designated exposure conditions.

The radiation detector 42 receives the irradiation of radiation that carries image information, records the image information, and outputs the recorded image information (data). For example, the radiation detector 42 is structured as a Flat Panel Detector (FPD) in which a radiation sensitive layer is disposed and that converts radiation into digital data and outputs the digital data. When radiation is irradiated, the radiation detector 42 outputs the image information (data) that expresses a radiographic image to the image capture device controller 46. In the present exemplary embodiment, the radiation detector 42 receives the irradiation of radiation that has passed through the breast N, and obtains image data that expresses a radiographic image.

The operation panel 44 allows a user to set various types of operation information, such as exposure conditions and posture information and the like, and various types of operation instructions, and the like.

The exposure conditions that are set at the operation panel 44 include information such as tube voltage, tube current, irradiation time period, posture information and the like, and the like. The posture information that is designated at the operation panel 44 includes information expressing the image capture positions (image capture postures, angles) when image capturing is carried out from plural directions with respect to the breast N.

Note that these various types of operation information such as exposure conditions, posture information, and various types of operation instructions may be set by an operator via the operation panel 44, or may be obtained from another control device (an Radiology Information System (RIS) which is a system that manages information regarding treatments, diagnoses and the like that use radiation) or the like, or may be stored in advance in a storage unit.

When the various types of information are set from the operation panel 44, the image capture device controller 46 executes capturing of a radiographic image by causing radiation to be irradiated from the radiation irradiating section 24 onto the irradiated region (the breast N) of the subject W in accordance with an image capture menu that is set on the basis of the various types of information that have been set. When image capturing is to be carried out from plural directions, the image capture device controller 46 adjusts the posture of the holding section 28 to the state in which the imaging surface 20 is directed upward, and adjusts the posture of the supporting section 29 to a state in which the radiation irradiating section 24 is positioned upward of the imaging surface 20. Then, as shown in FIG. 3, the image capture device controller 46 rotates the supporting section 29 and moves the radiation irradiating section 24 in the form of an arc by the predetermined angle $\theta$ each time from the angle $\alpha$, and, on the basis of the image capture conditions, causes radiation X to be irradiated onto the imaging surface 20 individually at the different angles from the radiation source 30 that is provided at the radiation irradiating section 24. In this way, N radiographic images are obtained.

The communication I/F section 48 is a communication interface for transmitting and receiving, via a network 49, captured radiographic images, various types of information, and the like between the radiographic image capture device 10 and the image processing device 50.

The image processing device 50 generates tomographic images by reconstructing radiographic images acquired from the radiographic image capture device 10 and performs image processing on the radiographic images for allowing a user such as a doctor to observe an object of interest such as a tumor or a calcification. In the present exemplary embodiment, a person, for example a doctor, that observes an object of interest such as a tumor or calcification and makes a diagnosis thereon based on captured radiographic images is referred to as a user, an object of user's observation such as a tumor or calcification is referred to as an object of interest, a region including the object of interest is referred to as a region of interest, and a position (coordinate) of the object of interest is referred to as a position of interest.

The image processing device 50 includes a CPU 52, a ROM 54, a RAM 56, an HDD 58, a communication I/F section 60, an image display instructing section 62, an instruction receiving section 64, a tomographic image generating section 66, an image analyzing section 68, a tomographic image detection section 70, and a storage section 72. These components are connected to one another via a bus 75, such as a control bus or a data bus, such that information and the like can be transferred thereamong.

The CPU 52 effects control of the image processing device 50 overall. Specifically, the CPU 52 carries out control by executing a program 55 that is stored in the ROM 54. Note that, the program 55 is stored in advance in the present exemplary embodiment, but embodiments are not limited to the same. The program 55 may be stored on a recording medium such as a CD-ROM or a removable disk, and may be installed into the ROM 54 or the like from the recording medium. Or, the program 55 may be installed in the ROM 54 or the like from an external device via a communication line such as the internet or the like. The RAM 56 provides work areas when the program 55 is executed by the CPU 52. The HDD 58 stores and holds various types of data.

The communication I/F section 60 is a communication interface for transmitting and receiving, via the network 49, captured radiographic images, various types of information, and the like between the image processing device 50 and the radiographic image capture device 10.

The image display instructing section 62 instructs a display 82 of the display device 80 to display radiographic images (a two dimensional image and tomographic images).

The display device 80 of the present exemplary embodiment displays captured radiographic images (the two-dimensional image and tomographic images), and includes the display 82, on which the radiographic images (the two-dimensional image and tomographic images) are displayed, and an instruction inputting section 84. The instruction inputting section 84 allows a user to input instructions relating to the display of the radiographic images (the two-dimensional image and tomographic images). Examples of the instruction inputting section 84 are a touch display, or a keyboard and a mouse, or the like.

The instruction receiving section 64 receives instructions from a user that are inputted from the instruction inputting section 84 of the display device 80. In the present exemplary embodiment, the instruction receiving section 64 receives instructions relating to a region of interest or position of interest (described in detail later) specified by a user based on a two-dimensional image, which is displayed on the display 82.

The tomographic image generating section 66 generates section (tomographic) images that are parallel to the imaging surface 20, by reconstructing plural radiographic images that are obtained by tomosynthesis imaging. Note that, in the present exemplary embodiment, the term "parallel" is used but encompasses substantially parallel as well.

The tomographic image generating section 66 generates tomographic images from plural radiographic images I that are captured at the positions P1, P2, P3, . . . Pn. The positions at which the object of interest is projected in the radiographic images differ in accordance with the image capture angles at which the radiation source 30 irradiates radiation from the respective positions. Thus, the tomographic image generating section 66 acquires, from the radiographic image capture device 10, the image capture conditions at the times of capturing the radiographic images, and, on the basis of the image capture angles that are included in the image capture conditions, computes the amounts of movement of the object of interest between the plural radiographic images, and reconstructs tomographic images on the basis of a known reconstruction method. In the present exemplary embodiment, tomographic images generated by reconstructing radiographic images obtained by tomosynthesis imaging at the tomographic image generating section 66 are formed in a three-dimensional image, while radiographic images used for generating the tomographic images, and radiographic images obtained by CC imaging, scout imaging or stereo imaging are two-dimensional images.

The image analyzing section 68 performs a predetermined image analysis (described later) on an image of a region of interest or image of a position of interest in a two-dimensional image including an object of interest, which has been specified by a user through the instruction inputting section 84 of the display device 80, and on images of corresponding regions or images of corresponding positions in tomographic images, and determines whether or not the two are similar. In the present exemplary embodiment, as described later, the method of image analysis is different between a case in which the size of the region of interest is equal to or greater than a predetermined size, and the other cases (cases in which the size of the region of interest is smaller than the predetermined size, or cases when a position of interest has been specified by a user).

The tomographic image detection section 70 detects a tomographic image, which includes a corresponding region or corresponding position that is similar to the region of interest or position of interest, from the plural tomographic images generated in the tomographic image generating section 66, based on the analysis result of the image analyzing section 68.

The storage section 72 stores the radiographic images captured by the radiographic image capture device 10 and the tomographic images generated by the same and includes a large-capacity storage such as a hard disk. The storage section 72 of the present exemplary embodiment also stores image capture conditions (such as an image capture angle) which have been used in the image capturing performed in the radiographic image capture device 10.

Operation of the radiographic image capture system 5 of the present exemplary embodiment is described next on the basis of the drawings.

In a case in which image capture of radiographic images is to be carried out, the image capture is executed in accordance with an image capture menu after the image capture menu is set at the radiographic image capture device 10.

In a case in which an imaging instruction to carry out image capture from plural directions on the breast N has been input, as shown in FIG. 2, the radiographic image capture device 10 adjusts the posture of the holding section 28 to the state in which the imaging surface 20 faces upward, and adjusts the posture of the supporting section 29 to the state in which the radiation irradiating section 24 is positioned upward of the imaging surface 20.

The breast N of the subject W is made to contact the imaging surface 20 of the radiographic image capture device 10. In this state, at the radiographic image capture device 10, after an operation instruction for the start of compression is given from an operator at the operation panel 44, the compression plate 26 moves toward the imaging surface 20.

In a case in which an imaging instruction to carry out image capture from plural directions on the breast N is input to the operation panel 44, the radiographic image capture device 10 rotates only the supporting section 29 and moves the radiation irradiating section 24 in the form of an arc, and, as shown in FIG. 3, moves the image capture position by the predetermined angle θ each time from the angle α, and carries out radiation of irradiation that is based on respective image capture conditions with the position of the radiation irradiating section 24 at the N places of P1 through PN. The radiation that is irradiated individually from the radiation irradiating section 24 respectively passes through the breast N, and thereafter, reaches the radiation detector 42.

After radiation is irradiated, the radiation detector 42 outputs the respective image data that express the radiographic images to the image capture device controller 46. In a case in which radiation is irradiated from the radiation irradiating section 24 at the N places of P1 through PN as described above, image data of N radiographic images is outputted to the image capture device controller 46.

The image capture device controller 46 outputs the input image data to the image processing device 50. In a case in which radiation is irradiated from the radiation irradiating section 24 at the N places of P1 through PN as described above, the CPU of the image capture device controller 46 outputs image data of N radiographic images to the image processing section 50.

At the image processing device 50, tomographic images are generated by reconstructing the N radiographic images input from the radiographic image capture device 10, and image display processing is performed for displaying the generated tomographic images on the display 82 of the display device 80, and further displaying a tomographic image, in which an object of interest is imaged, on the display 82.

Figure 5:
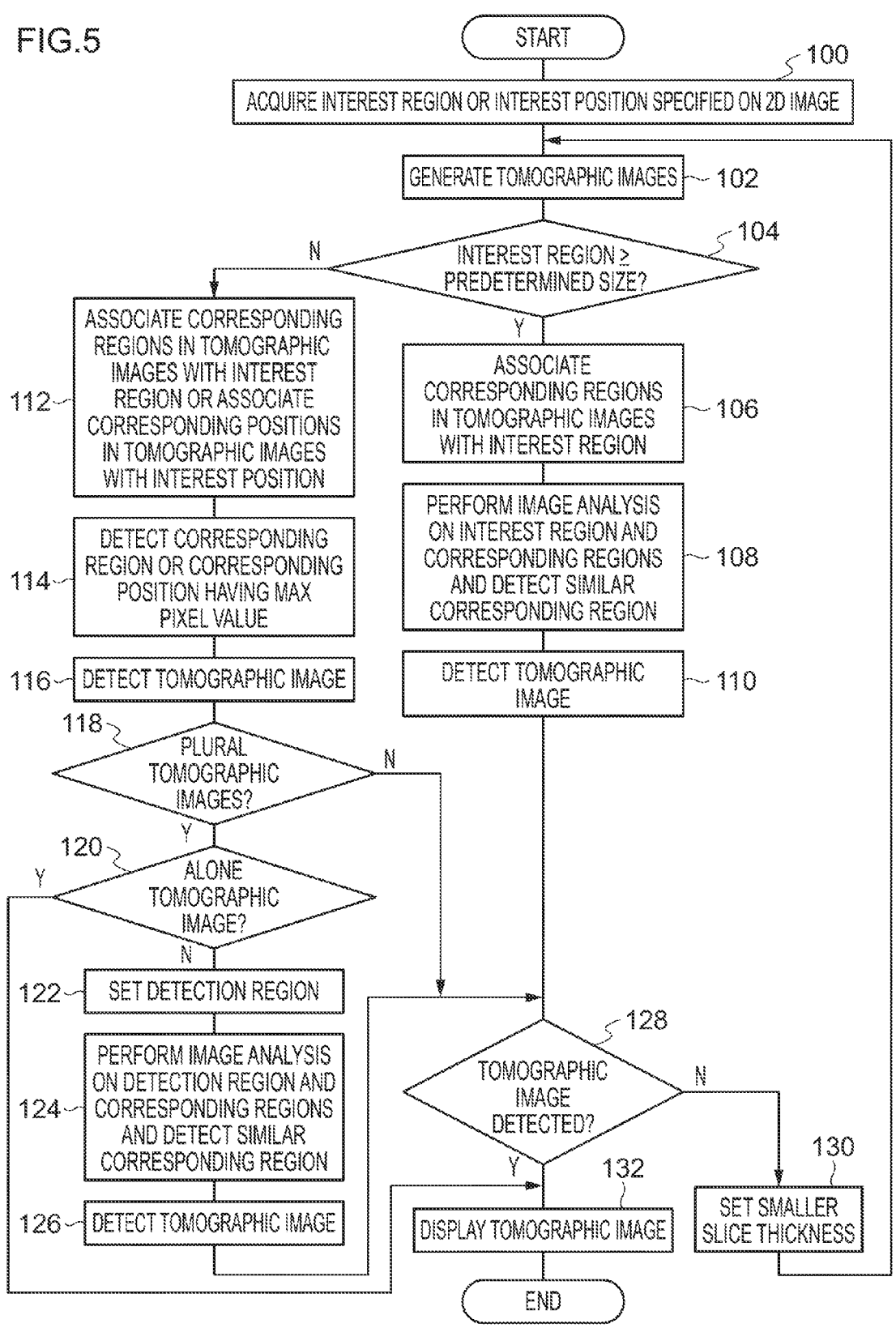
FIG. 5 is a flowchart showing an example of the flow of image display processing of the present exemplary embodiment.

FIG. 5 shows an exemplary flowchart of the image display processing performed at the image processing device 50. The processing is performed due to the control program 55 stored in the memory being executed by the CPU.

Figure 6:
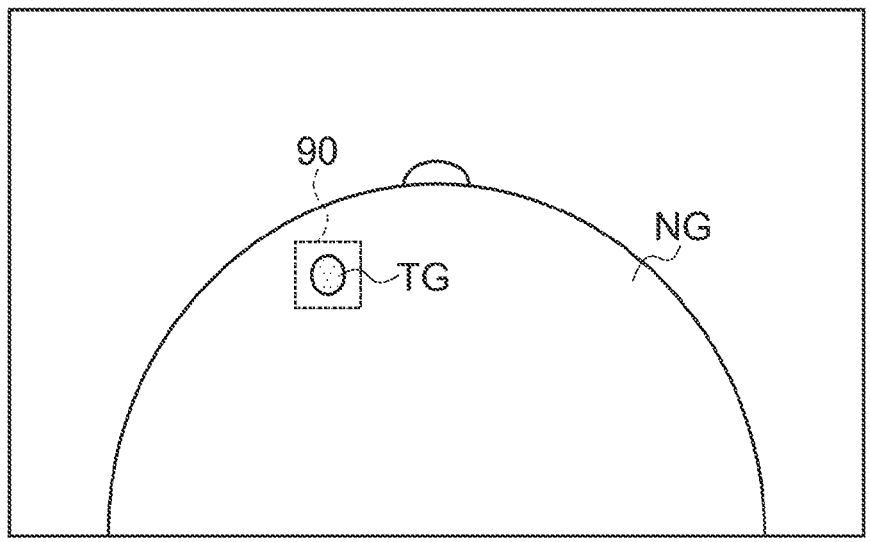
FIG. 6 is an explanatory drawing for explaining an example of detection of user's specification of a region of interest (interest region) in a two-dimensional image in tomographic image generation processing of the present exemplary embodiment.

In the present exemplary embodiment, the image display processing shown in FIG. 5 starts from a state in which a two-dimensional image, which has been captured in advance, is displayed in the display 82. A user may specify, using the instruction inputting section 84, a region of interest in which an object of interest (such as an abnormal shadow in the object of interest) is included, or a position of interest (x-y coordinates) of the object of interest on the two-dimensional image displayed on the display 82. For example, FIG. 6 shows a state in which a region of interest has been specified by a user (and is displayed on the display 82). FIG. 6 shows a state in which the region of interest 90 including the object of interest (an object image TG) in a breast image NG in the two-dimensional image (e.g., a scout image) is specified. In the present exemplary embodiment, a case is described in which a region of interest or position of interest is specified. However, embodiments are not limited to this and, for example, a shape of an object of interest can be specified. In this case, a region of interest is set by detecting a region including the specified shape.

After a region of interest or position of interest is specified by the user in this way, in step 100, the instruction receiving section 64 obtains the specified region of interest or position of interest.

In next step 102, the tomographic image generating section 66 generates plural tomographic images based on plural radiographic images that have been captured by the radiographic image capture device 10. In the present exemplary embodiment, a predetermined default set value of slice thickness is used as the slice thickness for reconstructing the tomographic images, if there is no specific designation or setting. In the present exemplary embodiment, the generated tomographic images are temporarily stored in the storage section 72. The generated tomographic images may or may not be displayed on the display 82. Further, a configuration may be provided such that a user can set whether or not the generated tomographic images are to be displayed.

In next step 104, it is determined whether or not the size of the region of interest is a predetermined size or greater. In the present exemplary embodiment, the method of image analysis employed in the image analyzing section 68 differs depending on whether or not the size of the region of interest is equal to or greater than the predetermined size, as described above.

Typically, a calcification has a relatively smaller size than a tumor. Therefore, in the present exemplary embodiment, the specified object of interest is regarded as a calcification if a small region of interest has been specified or a position of interest has been specified by a user. Since an image of a calcification generally appears as a sharp white image, the image analysis can be simplified in the case of a calcification because only white images (images having large pixel values) need to be detected by the image analysis (described in detail later).

Therefore, in the present exemplary embodiment, the object of interest is regarded as a tumor if the size of the region of interest is the predetermined size or greater, and the object of interest is regarded as a calcification if the size of the region of interest is smaller than the predetermined size or a position of interest has been specified, and mutually different methods of image analysis are employed respectively. The predetermined size may be set in advance based on sizes of images of calcification which have been obtained in the past, or may be set by a user.

Figure 7:
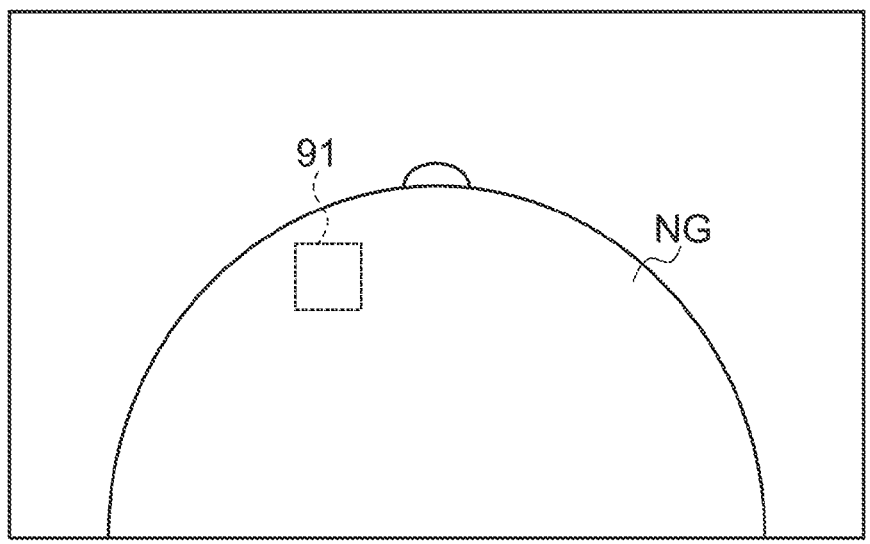
FIG. 7 is an explanatory drawing for explaining an example of setting a corresponding region in a tomographic image by associating the tomographic image with the region of interest in the tomographic image generation processing.

If the size of the region of interest is the predetermined size or greater, the determination in step 104 is affirmative, and the processing proceeds to step 106. In step 106, for each of the tomographic images, a region corresponding to the region of interest is set as a corresponding region 91 (see FIG. 7).

In next step 108, the image analyzing section 68 performs image analysis on the image of the region of interest and the images of the corresponding regions, detects one or more images of the corresponding regions that are similar to the image of the region of interest, and in next step 110, detects one or more tomographic images that include the one or more images of the corresponding regions that are similar to the image of the region of interest from the plural tomographic images, and proceeds to step 128.

Figure 8:
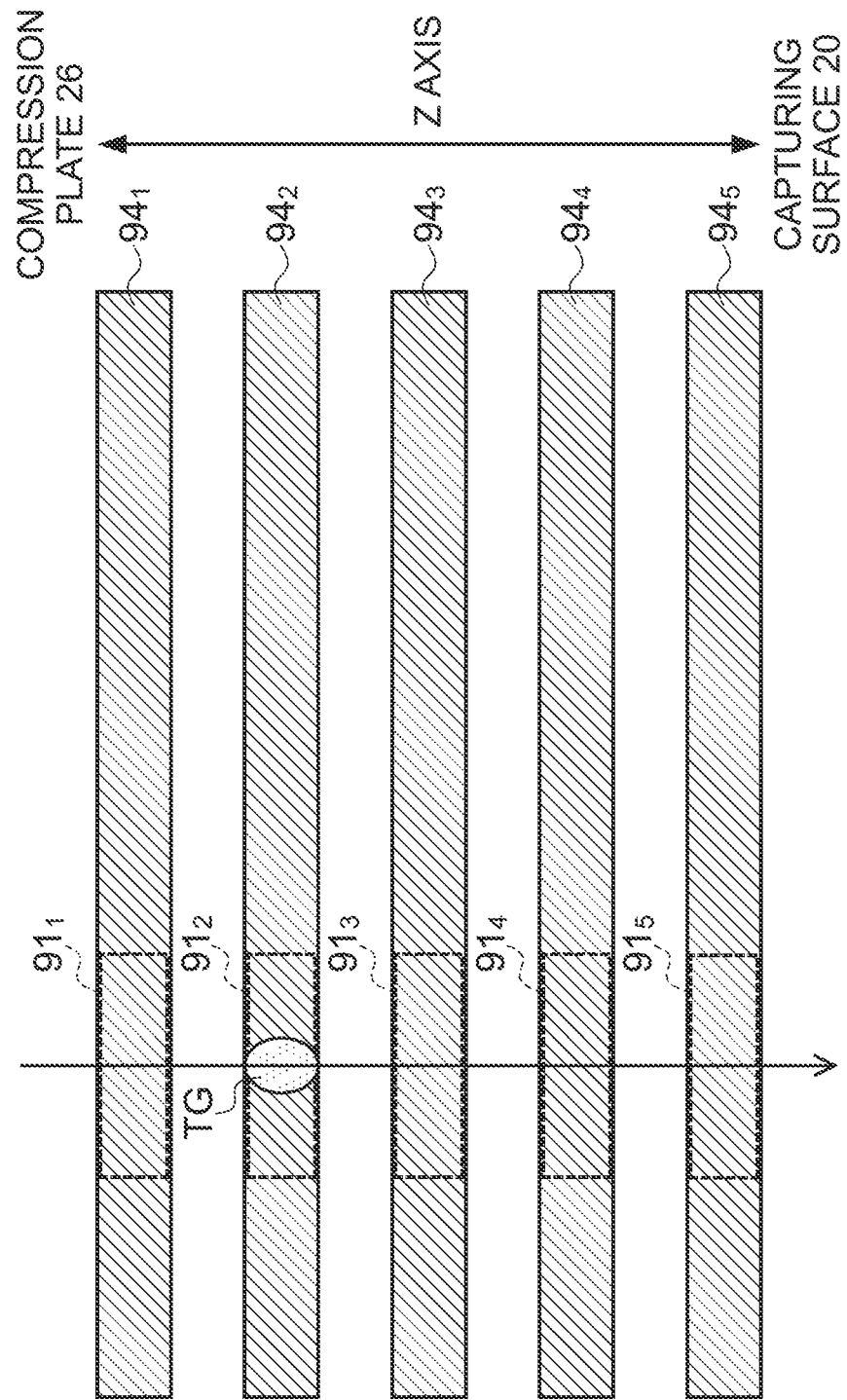
FIG. 8 is an explanatory drawing for explaining an example of detecting a tomographic image in which the image of the corresponding region is similar to the image of the region of interest in the tomographic image generation processing.

FIG. 8 shows, as an example, a case in which five tomographic images (tomographic images $94_1$ to $94_5$ in this order from the side close to the compression plate 26) are generated; however, the number of the tomographic images is not limited to this. In the case shown in FIG. 8, the corresponding region $91_2$ is detected as being similar to the region of interest by the image analysis, and the tomographic image $94_4$ is detected, which includes the corresponding region $91_2$.

Examples of the methods of image analysis that can be employed in the present exemplary embodiment include a method based on differences between pixel values of pixels. That is, absolute values of differences between pixel values of respective pixels of the image of the region of interest in the two-dimensional image and pixel values of respective pixels of the image of the corresponding region in one tomographic image are calculated, and a sum of the absolute values (for all pixels) is also calculated. This processing is performed for the corresponding regions in all of the tomographic images, and a corresponding region having the minimum sum value is detected as a similar corresponding region. In the present exemplary embodiment, a corresponding region having the minimum sum value is determined as a similar corresponding region in this way; however, embodiments are not limited to this. A configuration may be provided such that a corresponding region is determined as being similar if the sum value is less than a predetermined sum value in consideration of influences of differences between the imaging conditions or noise. In this case, if there is no image of a corresponding region having the sum value less than the predetermined sum value, it is regarded that there is no image of a similar corresponding region, and no tomographic image is detected in step 110.

Another example of the method of image analysis is a method using a normalized cross correlation coefficient. That is, normalized cross correlation coefficients are calculated using a known method based on densities (pixel values) of respective pixels of the image of the region of interest in the two-dimensional image and on densities (pixel values) of respective pixels of the image of the corresponding region in one tomographic image. This processing is performed for the corresponding regions in all of the tomographic images, and based on the fact that images are similar if the densities thereof have similar trends (positive correlations), a corresponding region having the maximum correlation coefficient is detected as a similar corresponding region. In the present exemplary embodiment, a corresponding region having the maximum correlation coefficient is determined as a similar corresponding region in this way; however, embodiments are not limited to this. A configuration may be provided such that a corresponding region is determined as being similar if the correlation coefficient is greater than a predetermined value in consideration of influences of differences between the imaging conditions or noise. In this case, if there is no image of a corresponding region having a correlation coefficient greater than the predetermined value, it is regarded that there is no image of a similar corresponding region, and no tomographic image is detected in step 110.

The method of image analysis is not limited to the above methods as long as it is an image analysis method that can analyze similarity of images, and may be selected from any known methods including pattern matching, spectrum analysis, spatial frequency analysis and texture analysis, such as a texture analyzing method disclosed in JP-A No. 2002-170122, or an image analysis method disclosed in JP-A No. 2007-33157. Further, plural image analysis methods may be combined and used.

In step 104, if the size of the region of interest is not equal to or greater than the predetermined size, that is, if the size of the region of interest is less than the predetermined size or a position of interest has been specified, the determination is negative, and the processing proceeds to step 112. In step 112, for each of the plural tomographic images, a region corresponding to the region of interest is set as the corresponding region 91, or if the position of interest has been specified, a position corresponding to the position of interest is set as a corresponding position.

In this case, since the object of interest is regarded as a calcification as described above, in next step 114, image processing for detecting an image of a corresponding region or corresponding position that is a white image, which can be regarded as an image of a calcification, is performed. That is, an image of a corresponding region or corresponding position having the maximum pixel value is detected, and in next step 116, one or more tomographic images that include the detected image of the similar corresponding region or corresponding position are detected from the plural tomographic images. In this regard, in order to reduce the influence of noise or the like, an average value of pixels values of pixels of the image of the region of interest or the position of interest that has been specified, and of the images of the corresponding regions or corresponding positions including peripheral portions thereof may be calculated, and an image of the corresponding region or corresponding position having the maximum pixel value (average value) may be detected as being similar. In the present exemplary embodiment, an image having the maximum pixel value is regarded as a white image; however, embodiments are not limited to this. A configuration may be provided such that an image is determined as being similar if the respective pixel values are greater than a predetermined pixel value in consideration of influences due to differences between the imaging conditions or noise. In this case, if there is no image of a corresponding region or corresponding position having respective pixel values greater than the predetermined pixel value, it is regarded that there is no similar image, and no tomographic image is detected in step 116.

Figure 9:
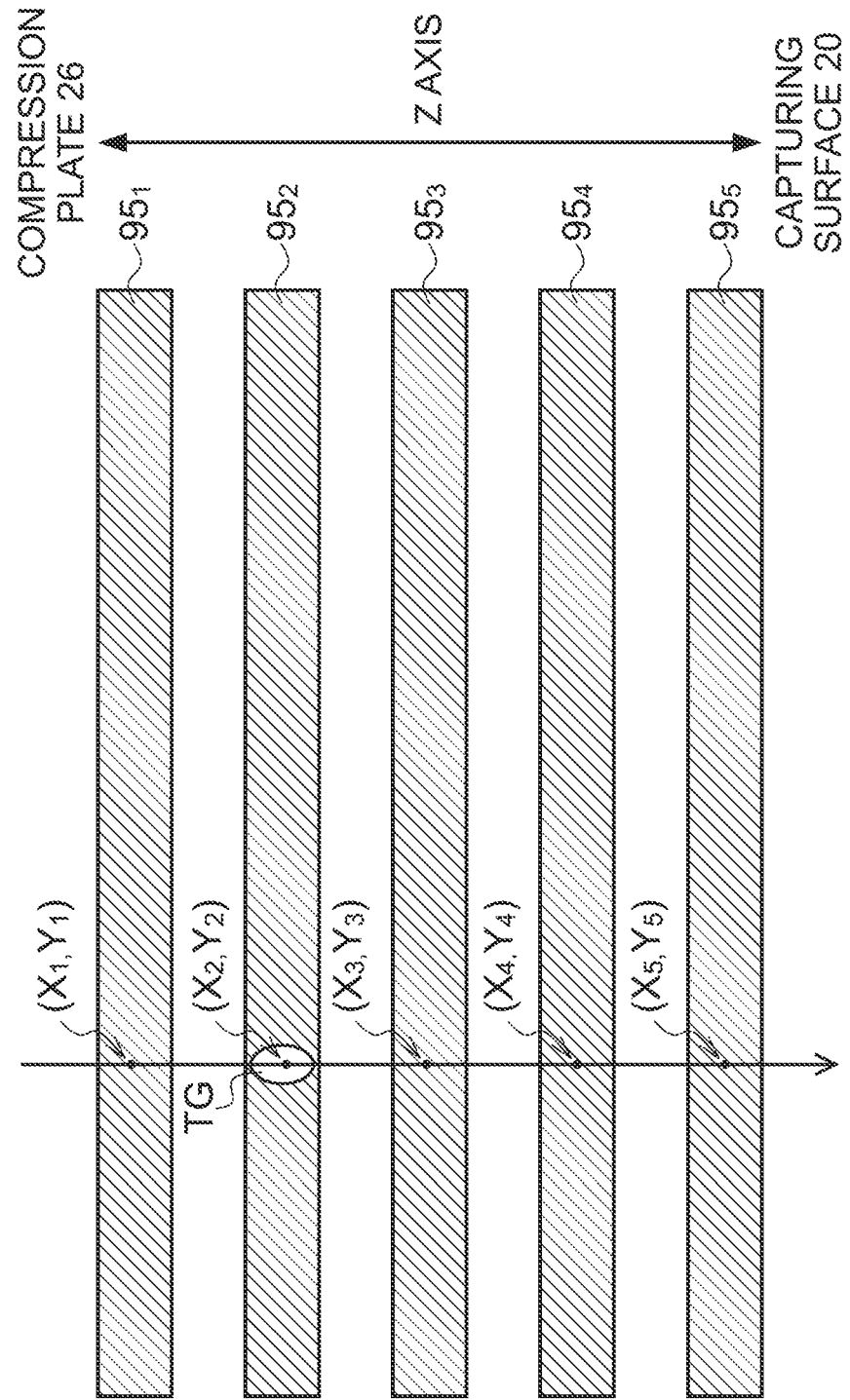
FIG. 9 is an explanatory drawing for explaining an example of detecting a tomographic image in which the image of the corresponding position is similar to an image of a position of interest (interest position) in the tomographic image generation processing.

FIG. 9 shows an example of a case in which a position of interest has been specified and five tomographic images (tomographic images $95_1$ to $95_5$ in this order from the side close to the compression plate 26) are generated; however, the number of the tomographic images is not limited to this. In the case shown in FIG. 9, an image of a corresponding position $(x_2, y_2)$ is detected as being similar to the image of the position of interest, and the tomographic image $95_2$ that includes the corresponding position $(x_2, y_2)$ is detected.

In step 118, determination is made as to whether or not plural tomographic images have been detected. If one tomographic image has been detected or no tomographic image has been detected, the determination is negative, and the processing proceeds to step 128. However, if plural tomographic images have been detected, the determination is affirmative, and the processing proceeds to step 120.

A case in which plural tomographic images have been detected will be described next in reference to FIG. 10. In a case in which there is a different tissue such as a tumor or lesion at the corresponding regions or corresponding positions, the region corresponding to the different tissue may also be formed as a white image. FIG. 10 shows an example in which images of a different tissue have been captured in the tomographic images $95_4$ and $95_5$. In the case shown in FIG. 10, since the corresponding positions $(x_4, y_4)$ and $(x_5, y_5)$ are also formed as white images, the tomographic images $95_4$ and $95_5$ are detected as well as the tomographic image $95_2$ in which the corresponding position $(x_2, y_2)$ that indicates the object image TG is included. As a result, three tomographic images are detected.

Typically, the size of a calcification is minute and is only several mm or less. Therefore, if white images exist across plural tomographic images, i.e., if adjacent tomographic images are detected, there is a high possibility that these white images are not images of a calcification and are images of a different tissue.

Therefore, in next step 120, a determination is made as to whether there is a tomographic image that has been detected alone, which has no adjacent detected tomographic image, among the plural tomographic images. If there is a tomographic image that has been detected alone (the tomographic image $95_2$ in FIG. 10), the determination is affirmative, and the processing proceeds to step 132. However, if there is no tomographic image that has been detected alone, the determination is negative, and the processing proceeds to step 122.

Figure 11A:
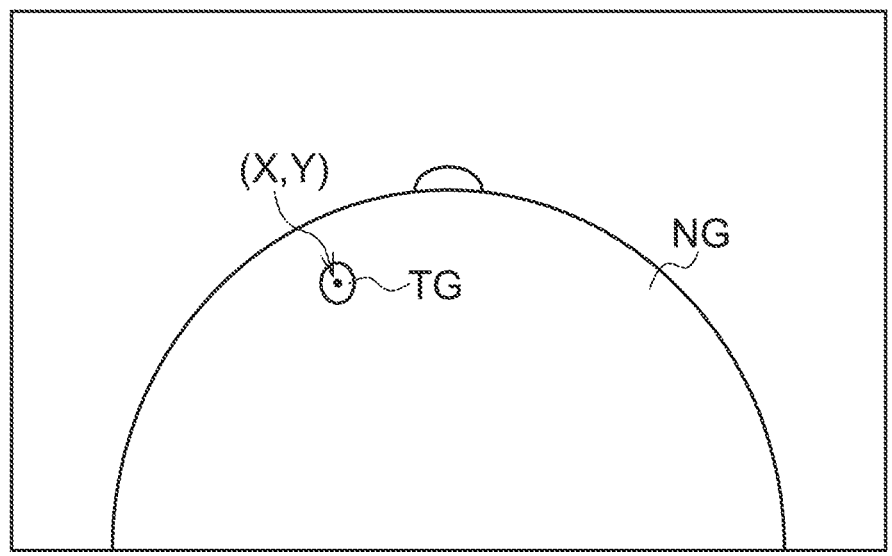
Figure 11B:
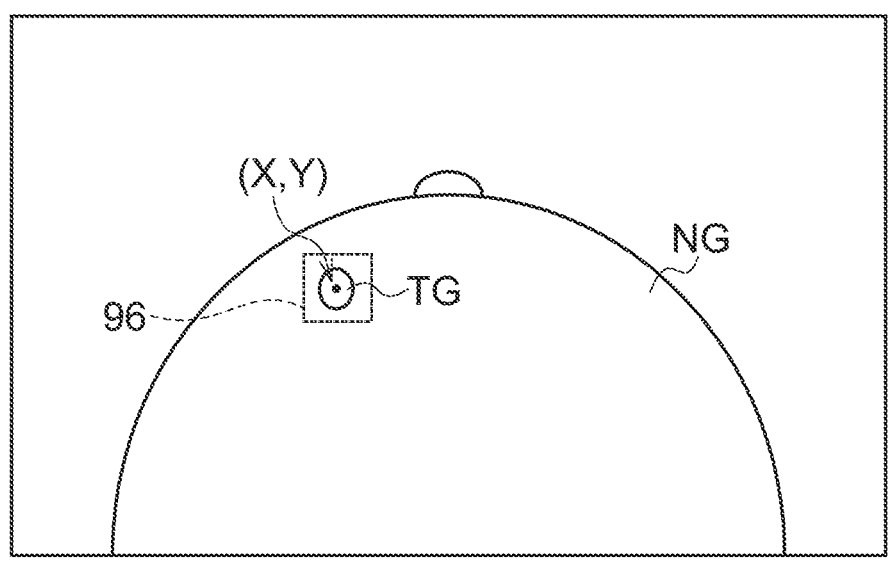

In step 122, a detection region around the position of interest or region of interest is set. In the present exemplary embodiment, if there is no tomographic image that has been detected alone, a region larger than the position of interest or region of interest specified by a user is set as the detection region in order to improve accuracy of the image analysis. For example, in a case in which a position of interest (x, y) has been specified by a user as shown in FIG. 11A, a region having a predetermined size around the position of interest (x, y) is set as the detection region 96 as shown in FIG. 11B. If a region of interest has been specified by a user, the detection region 96 only needs to be larger than the region of interest, but preferably is larger than the predetermined size which is used in the determination at step 104.

After setting the detection region 96 in this way, the processing proceeds to step 124. Steps 124 and 126 respectively correspond to steps 108 and 110 which have been described above, and in a similar manner, the image analyzing section 68 analyzes the image of the region of interest (detection region) and the images of the corresponding regions, detects an image of a corresponding region that is similar to the image of the region of interest (detection region), and detects a tomographic image that includes the image of the similar corresponding region. Then, the processing proceeds to step 128.

In step 128, a determination is made as to whether a tomographic image has been detected. If there is no tomographic image detected, the determination is negative, and the processing proceeds to step 130. If there is no tomographic image detected, there is a high possibility that the slice thickness used when the tomographic images were generated at the tomographic image generating section 66 was not appropriate and a minute object of interest such as a calcification has not been appropriately imaged in the tomographic images due to a wide tomography pitch between the tomographic images. Therefore, there is a need to generate tomographic images with a finer tomography pitch. Accordingly, in step 130, the slice thickness used for generating tomographic images at the tomographic image generating section 66 is set to be smaller (for example, smaller than the default set value), and then, the processing returns to step 102 and generates new tomographic images by reconstructing the radiographic images. Further, the processing is repeated for detecting a tomographic image that includes an image of a corresponding region or corresponding position that is similar to the image of the region of interest or position of interest from the newly generated tomographic images.

However, if there is a detected tomographic image in step 128, the determination is affirmative, and the processing proceeds to step 132. In step 132, the image display instructing section 62 instructs the display device 80 to display the detected tomographic image on the display 82, and then the processing ends. If there are plural detected tomographic images, the tomographic images may be displayed on the display 82 in order starting from a tomographic image including an image of a corresponding region or corresponding position having high similarity to those having low similarity.

As described above, in the radiographic image capture system 5 of the present exemplary embodiment, the radiographic image capture device 10 captures plural radiographic images by irradiating radiation onto the breast N of the subject W from different angles, which is called tomosynthesis imaging. The image processing device 50 acquires the captured plural radiographic images and generates tomographic images at the tomographic image generating section 66. Further, a two-dimensional image (a scout image that is captured by irradiating the subject W with radiation from a direction substantially orthogonal to the imaging surface 20) is acquired by the radiographic image capture device 10 and is displayed on the display 82 of the display device 80. The image processing device 50 receives via the instruction receiving section 64 a specification of a region of interest or position of interest including an object of interest, which is specified by a user on the two-dimensional image displayed on the display 82. Then, the image analyzing section 68 associates the received region of interest or position of interest with the tomographic images and sets the associated regions in the tomographic images to be corresponding regions or corresponding positions. The image analyzing section 68 performs image analysis on the image of the region of interest or position of interest, and the images of the corresponding regions or corresponding positions, and detects one or more images of the corresponding regions or corresponding positions that are similar to the image of the region of interest. The tomographic image detection section 70 detects one or more tomographic images that include the one or more similar images of the corresponding regions or corresponding positions, and the detected one or more tomographic images are displayed on the display 82.

In this way, image analysis is performed by the image analyzing section 68 on the image of the region of interest or position of interest which has been specified on the two-dimensional image, and on the images of the corresponding regions or corresponding positions that correspond to the region of interest, and one or more tomographic images, each of which includes an image of a corresponding region or corresponding position similar to the region of interest or position of interest, are detected, and the detected one or more tomographic images are displayed by the display device 80. Since displaying of a tomographic image in which the object of interest is not imaged on the display 82 of the display device 80 is prevented, a user does not need to interpret plural tomographic images by switching the plural tomographic images one by one on the display 82, and can interpret the tomographic images efficiently. Accordingly, the efficiency of a workflow of observation or medical examination of an object of interest in the breast N of the subject W using tomographic images acquired by tomosynthesis imaging can be improved.

Further, in a case in which observation or medical examination of an object of interest is performed using two two-dimensional images (for example, stereo images) and tomographic images, the two-dimensional images need to be captured from two different directions at different angles (i.e., image capturing needs to be performed two times). However, in the present exemplary embodiment, since a single two-dimensional image is used, image capturing is required only one time. Therefore, the exposure amount of the subject W can be reduced, the capture time can also be reduced, and the capacity of the storage section 72 required for storing the two-dimensional image can be reduced as well.

In the present exemplary embodiment, the image analyzing section 68 performs different image analysis depending on whether or not the size of the region of interest is equal to or greater than the predetermined size. If the size of the region of interest is equal to or greater than the predetermined size, the image analyzing section 68 regards the object of interest as tissue of a tumor or the like, performs image analysis accordingly on the image of the region of interest and the images of the corresponding regions, and detects one or more images of the corresponding regions that are similar to the image of the region of interest, and the tomographic image detection section 70 detects one or more tomographic images that include the one or more similar images of the corresponding regions. However, if the size of the region of interest is less than the predetermined size or a position of interest has been specified, the object of interest is regarded as a calcification that is relatively smaller than a tumor and tends to be imaged as a white image, and an image of the corresponding region or corresponding position that includes pixels having pixel values by which it can be regarded that the image of the corresponding region or corresponding position is a white image is detected. In this way, since an optimal image analysis can be performed depending on the object of interest, the time required for the image analysis can be reduced without deteriorating the accuracy of the image analysis, and one or more detected tomographic images can be displayed more rapidly on the display 82.

Figure 12:
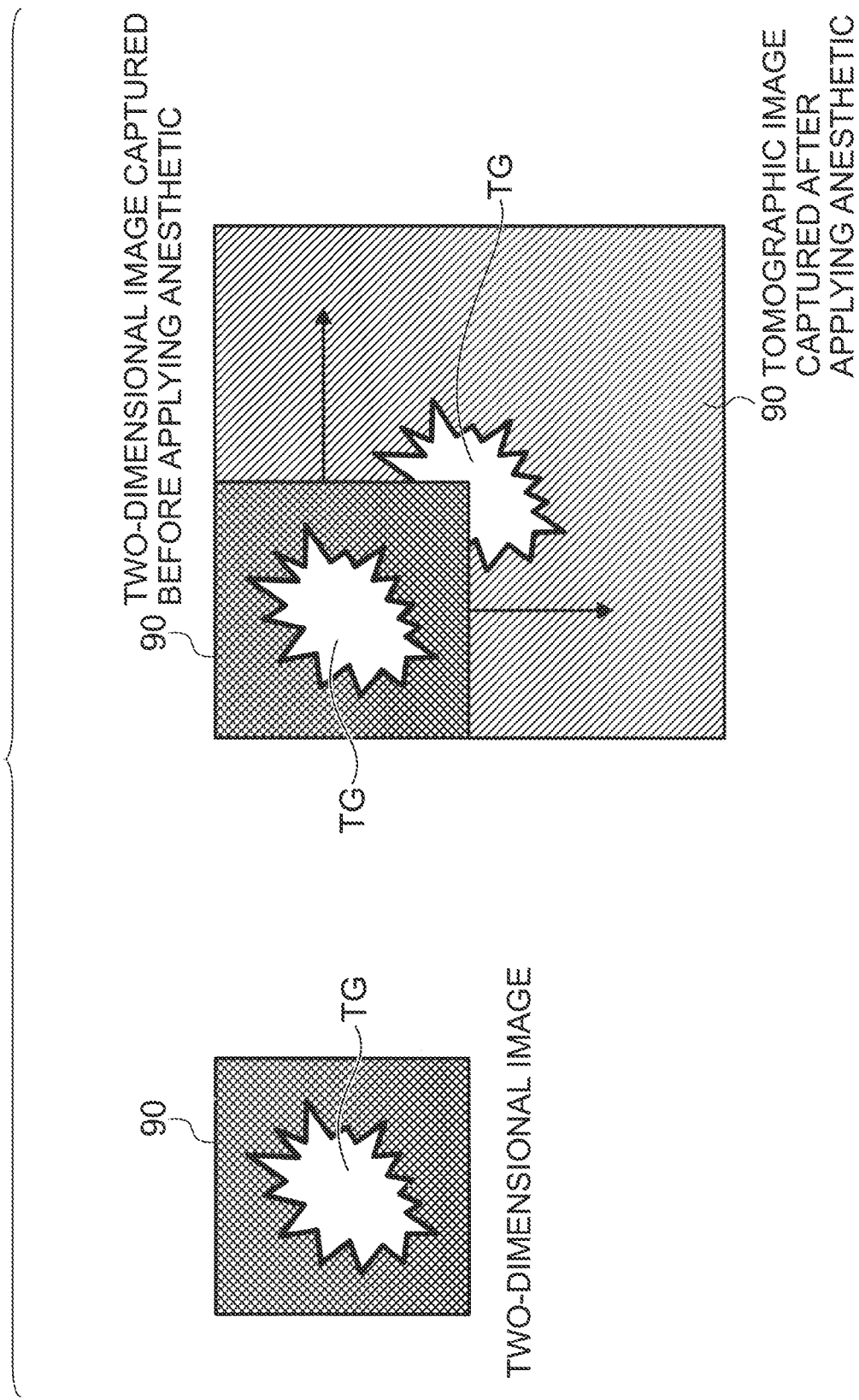
FIG. 12 is an explanatory drawing for explaining an image analysis for performing a biopsy in the radiographic image capture system of the present exemplary embodiment.

In the present exemplary embodiment, a case in which a user performs a normal medical examination on the subject W has been described. However, embodiments are not limited to this, and the invention may be applied to a case in which a biopsy is performed on the subject W. In this case of performing a biopsy, since an anesthetic is applied to the breast N of the subject W before inserting a biopsy needle, there may be cases in which the position of the object of interest is displaced from the position before applying the anesthetic due to variation of the form of the breast N. Therefore, in this case, as shown in FIG. 12, the size of the corresponding region may be set larger than that of the region of interest, or a calculation range of the correlation coefficient may be set larger than usual. Further, as shown in FIG. 12, in this case, the correlation coefficient may be calculated by, for example, moving the image of the corresponding region 90 in a pixel unit of the tomographic image.

Further, in the present exemplary embodiment, the radiographic image capture device 10 is configured such that the radiation irradiating section 24 in which the radiation source 30 is provided is moved to respective image capture positions (predetermined angles) and the breast N of the subject W is irradiated with radiation from the respective image capture positions. However, the configuration is not limited thereto, and, for example, plural radiation sources 30 may be respectively provided at the image capture positions, and irradiation with radiation may be performed from the plural radiation sources 30 without moving the radiation irradiating section 24.

In the present exemplary embodiment, the tomographic images are generated by reconstructing the radiographic images stored in the storage section 72 of the image processing device 50. However, embodiments are not limited to this, and the tomographic images may be generated by reconstructing radiographic images that are received from an external device via the network 49 or the like.

The present exemplary embodiment has been described as being applied to generation of tomographic images from radiographic images captured by a mammography machine. However, embodiments are not limited to this, and the invention may be applied to generation of tomographic images from radiographic images that are captured by other radiographic image capture devices.

Still further, the radiation that is used in capturing the radiographic images is not particularly limited, and X-rays, γ-rays, or the like can be used.

In addition, the structures of the radiographic image capture system 5, the radiographic image capture device 10, the image processing device 50 and the display device 80 that are described in the present exemplary embodiment are examples, and, of course, can be changed in accordance with the situation within a scope that does not deviate from the gist of the present invention.

Further, the flow of the image display processing described in the present exemplary embodiment is also an example, and, of course, can be changed in accordance with the situation within a scope that does not deviate from the gist of the present invention.

What is claimed is:

1. An image processing device comprising:
 a tomographic image generating section that acquires a plurality of first radiographic images from a radiographic image detector, the first radiographic images are captured by the radiographic image detector by irradiating radiation, from a radiation irradiating section that is provided so as to face the radiographic image detector, from different angles with respect to a subject that is on the radiographic image detector, and generates a plurality of tomographic images of the subject by reconstructing the plurality of first radiographic images using a detection surface of the radiographic image detector as a reference;
 a display processing section that displays on a display section a second radiographic image that is acquired by the radiographic image detector by irradiating radiation from the radiation irradiating section from a predetermined angle with respect to the subject on the radiographic image detector; and
 a detection section that,
  (a) when a region of interest including an object of interest is specified on the displayed second radiographic image, performs image analysis by comparing the region of interest with corresponding regions that are regions in the plurality of tomographic images corresponding to the region of interest, and detects a tomographic image including a corresponding region that is similar to the region of interest based on a result of the image analysis, and (b) when a position of interest of the object of interest is specified on the second radiographic image, performs image analysis by comparing the position of interest with corresponding positions that are positions in the plurality of tomographic images corresponding to the position of interest, and detects a tomographic image including a corresponding position that is similar to the position of interest based on a result of the image analysis, wherein when a size of the region of interest is equal to or greater than a predetermined size, the detection section performs image analysis based on pixel values of pixels of the region of interest and on pixel values of pixels of the corresponding regions.

2. The image processing device of claim 1, wherein
(a1) when the size of the region of interest is less than the predetermined size, the detection section determines a corresponding region, in which pixel values of respective pixels are equal to or greater than a predetermined pixel value, as being similar to the region of interest, and
(b1) when the position of interest is specified, the detection section determines a corresponding position, in which pixel values of respective pixels are equal to or greater than the predetermined pixel value, as being similar to the position of interest.

3. The image processing device of claim 2, wherein the detection section excludes, from a detection result, tomographic images that are adjacent in a direction of the reconstructing using the detection surface of the radiographic image detector as the reference.

4. The image processing device of claim 2, wherein
(a2) when a plurality of tomographic images including the corresponding region that is similar to the region of interest are detected, the detection section sets a detection region that includes the region of interest and is larger than the predetermined size, and performs image analysis based on pixel values of pixels of the detection region and on pixel values of pixels of the corresponding regions, and
(b2) when a plurality of tomographic images including the corresponding position that is similar to the position of interest are detected, the detection section sets a detection region that includes the position of interest, and performs image analysis based on pixel values of pixels of the detection region and on pixel values of pixels of the corresponding positions.

5. The image processing device of claim 1, wherein when a result of the image analysis of the detection section indicates that there is no corresponding region or corresponding position that is similar to the region of interest or the position of interest, the tomographic image generating section reduces a slice thickness for generating tomographic images, and regenerates the tomographic images.

6. The image processing device of claim 1, wherein the display processing section displays the detected tomographic image on the display section.

7. The image processing device of claim 6, wherein, when a plurality of tomographic images are detected by the detection section, the display processing section displays the detected tomographic images in order starting from a tomographic image including a corresponding region or corresponding position that has high similarity with the region of interest or the position of interest.

8. The image processing device of claim 1, wherein the predetermined angle is an angle of a direction that intersects with the detection surface of the radiographic image detector.

9. A radiographic image capture system comprising:
a radiographic image capture device that captures a plurality of radiographic images by a radiographic image detector, by irradiating radiation from a radiation irradiating section that is provided so as to face the radiographic image detector, from different angles with respect to a subject that is on the radiographic image detector; and
the image processing device according to claim 1, which generates tomographic images from the radiographic images.

10. An image processing method comprising:
acquiring a plurality of first radiographic images from a radiographic image detector, which are captured by the radiographic image detector by irradiating radiation, from a radiation irradiating section, that is provided so as to face the radiographic image detector, from different angles with respect to a subject that is on the radiographic image detector;
generating a plurality of tomographic images of the subject by reconstructing the plurality of first radiographic images using a detection surface of the radiographic image detector as a reference;
displaying on a display section a second radiographic image that is acquired by the radiographic image detector by irradiating radiation from the radiation irradiating section from a predetermined angle with respect to the subject on the radiographic image detector;
when a region of interest including an object of interest is specified on the displayed second radiographic image, performing image analysis by comparing the region of interest with corresponding regions that are regions in the plurality of tomographic images corresponding to the region of interest, and detecting a tomographic image including a corresponding region that is similar to the region of interest based on a result of the image analysis; and
when a position of interest of the object of interest is specified on the second radiographic image, performing image analysis by comparing the position of interest with corresponding positions that are positions in the plurality of tomographic images corresponding to the position of interest, and detecting a tomographic image including a corresponding position that is similar to the position of interest based on a result of the image analysis; and
when a size of the region of interest is equal to or greater than a predetermined size, performing the image analysis based on pixel values of pixels of the region of interest and on pixel values of pixels of the corresponding regions.

11. The image processing method of claim 10, further comprising:
when the size of the region of interest is less than the predetermined size, determining a corresponding region, in which pixel values of respective pixels are equal to or greater than a predetermined pixel value, as being similar to the region of interest, and
when the position of interest is specified, determining a corresponding position, in which pixel values of respective pixels are equal to or greater than the predetermined pixel value, as being similar to the position of interest.

12. The image processing method of claim 11, further comprising excluding, from a detection result, tomographic images that are adjacent in a direction of the reconstructing using the detection surface of the radiographic image detector as the reference.

13. The image processing method of claim 11, further comprising:
when a plurality of tomographic images including the corresponding region that is similar to the region of interest are detected, setting a detection region that includes the region of interest and is larger than the predetermined size, and performing image analysis based on pixel values of pixels of the detection region and on pixel values of pixels of the corresponding regions; and
when a plurality of tomographic images including the corresponding position that is similar to the position of interest are detected, setting a detection region that includes the position of interest, and performing image analysis based on pixel values of pixels of the detection region and on pixel values of pixels of the corresponding positions.

14. The image processing method of claim 10, further comprising, when a result of the image analysis indicates that there is no corresponding region or corresponding position that is similar to the region of interest or the position of interest, reducing a slice thickness for generating tomographic images, and regenerating the tomographic images.

15. The image processing method of claim 10, further comprising displaying the detected tomographic image on the display section.

16. The image processing method of claim 15, further comprising, when a plurality of tomographic images are detected, the detected tomographic images are displayed in order starting from a tomographic image including a corresponding region or corresponding position that has high similarity with the region of interest or the position of interest.

17. The image processing method of claim 10, wherein the predetermined angle is an angle of a direction that intersects with the detection surface of the radiographic image detector.

18. A non-transitory computer readable storage device storing a program that causes a computer to perform image processing, the image processing comprising:
acquiring a plurality of first radiographic images from a radiographic image detector, which are captured by the radiographic image detector by irradiating radiation, from a radiation irradiating section, that is provided so as to face the radiographic image detector, from different angles with respect to a subject that is on the radiographic image detector;
generating a plurality of tomographic images of the subject by reconstructing the plurality of first radiographic images using a detection surface of the radiographic image detector as a reference;
displaying on a display section a second radiographic image that is acquired by the radiographic image detector by irradiating radiation from the radiation irradiating section from a predetermined angle with respect to the subject on the radiographic image detector;
when a region of interest including an object of interest is specified on the displayed second radiographic image, performing image analysis by comparing the region of interest with corresponding regions that are regions in the plurality of tomographic images corresponding to the region of interest, and detecting a tomographic image including a corresponding region that is similar to the region of interest based on a result of the image analysis; and
when a position of interest of the object of interest is specified on the second radiographic image, performing image analysis by comparing the position of interest with corresponding positions that are positions in the plurality of tomographic images corresponding to the position of interest, and detecting a tomographic image including a corresponding position that is similar to the position of interest based on a result of the image analysis; and
when a size of the region of interest is equal to or greater than a predetermined size, performing the image analysis based on pixel values of pixels of the region of interest and on pixel values of pixels of the corresponding regions.

* * * * *